(12) United States Patent
Fujino et al.

(10) Patent No.: US 6,462,130 B2
(45) Date of Patent: Oct. 8, 2002

(54) POLYAMIDE-MODIFIED POLYOLEFINIC COMPOSITION AND USES THEREOF

(75) Inventors: Kenichi Fujino; Kazuhiro Usui; Terumasa Fujitaka; Hidetoshi Yoshioka; Hideaki Mitsui, all of Iwakuni (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/531,164

(22) Filed: Mar. 17, 2000

(65) Prior Publication Data

US 2002/0032277 A1 Mar. 14, 2002

(30) Foreign Application Priority Data

| Mar. 18, 1999 | (JP) | 11-074104 |
| Feb. 3, 2000 | (JP) | 12-026098 |

(51) Int. Cl.$^7$ .............................................. C08G 63/48
(52) U.S. Cl. ........................................ 525/66; 525/183
(58) Field of Search ................................... 525/66, 183

(56) References Cited

U.S. PATENT DOCUMENTS

| 5,160,475 A | 11/1992 | Asano et al. ........... 264/331.17 |
| 5,214,090 A | 5/1993 | Moriyama et al. .......... 524/424 |
| 5,278,229 A | 1/1994 | Asano et al. ................. 525/57 |
| 5,298,334 A | 3/1994 | Moriyama et al. ....... 428/474.4 |
| 5,389,432 A | 2/1995 | Blanch et al. ............... 428/288 |
| 5,534,577 A | 7/1996 | Namaba et al. ............. 524/377 |
| 5,559,176 A | 9/1996 | Namaba et al. ............. 524/377 |
| 5,563,195 A | 10/1996 | Namaba et al. ............. 524/247 |
| 5,728,767 A | 3/1998 | Namaba et al. ............. 524/504 |

FOREIGN PATENT DOCUMENTS

| GB | 2 226 035 | 6/1990 |
| JP | 04-122736 | 4/1992 |
| JP | 05-279431 | 10/1993 |
| JP | 09-310014 | 12/1997 |
| JP | 10-287749 | 10/1998 |

OTHER PUBLICATIONS

J.–E. Bidaux, et al., Polymer, vol. 37, No. 7, 2 pages, "Fusion Bonding of Maleic Anhydride Grafted Polypropylene to Polyamide 6 Via In Situ Block Copolymer Formation at the Interface," May 9, 1995.

*Primary Examiner*—Ana Woodward
(74) *Attorney, Agent, or Firm*—Oblon, Spivak, McClelland, Maier & Neustadt, P.C.

(57) ABSTRACT

Disclosed is a polyamide-modified polyolefin composition obtainable by heating to react modified polyolefin with weight average molecular weight of not less than 5,000 to not more than 150,000, graft modified so as the content of unsaturated carboxylic acid anhydride to become 0.1 to 20 wt. % and polyamide with number average molecular weight of not less than 3,000 to not more than 30,000 at a particular weight ratio. The purpose is to provide a novel chlorine-free modified polyolefin with excellent adherence to polyolefin substrates, with no tack, and also with excellent cohesion.

14 Claims, No Drawings

POLYAMIDE-MODIFIED POLYOLEFINIC COMPOSITION AND USES THEREOF

BACKGROUND OF THE INVENTION

The present invention relates to a novel chlorine-free modified polyolefin with excellent adherence to nonpolar sheets, films and moldings such as polypropylene, polyethylene, ethylene-propylene copolymer, ethylene-propylene-diene copolymer and ethylene-vinyl acetate, with no tack, and also with excellent cohesion.

Because of low price and many excellent properties such as moldability, chemical resistance, water resistance and electrical characteristics, polyolefin such as polypropylene and polyethylene are used widely in recent years as sheets, films and moldings, etc. Different from polar substrates such as polyurethane resin, polyamide resin, acrylic resin and polyester resin, however, polyolefinic substrates are nonpolar and crystalline, leading to drawbacks of difficult paintability and adhesion.

So far, modified polyolefins obtainable by modifying polyolefins with unsaturated carboxylic acid and/or acid anhydride and further acid-modified chlorinated polyolefins obtainable by chlorinating them have been used as paint additives, primers and adhesives, because of excellent adherence to said nonpolar substrates. However, conventional acid-modified polyolefins represented by maleic anhydride-modified polyolefins have drawbacks of poorer adherence to nonpolar substrates, more liability to cause cohesive failure, stranger tackiness, etc. compared with chlorination type modified polyolefins. Moreover, chlorinated polyolefins with excellent adherence also have drawbacks of poor weather resistance etc. and, in addition, from recent upsurge of environmental problems, their uses have also become to be restricted. Based on such background, the development of novel chlorine-free resin with adherence to nonpolar substrates equal to or more than that of chlorinated polyolefin and with excellent physical properties such as tackiness and cohesion has been expected.

On the other hand, with regard to combinations of modified polyolefin with polyamide, there are reports for the purposes of improved physical properties such as thermal creep resistance and shock resistance of moldings in for example, Japanese Unexamined Patent Publication Nos. Hei 4-122736, Hei 9-310014 and Hei 10-287749. In Polymer, 37 (7), 1129 (1996), etc., the compatibility of polyolefin-polyamide type alloys is reported. Moreover, Japanese Unexamined Patent Publication No. Hei 5-279431 reports that, by reacting polyamide with unreacted unsaturated acid and/or acid anhydride in acid-modified polyolefin, the offensive odor and skin irritability were improved.

However, in the application fields of rein featured by having excellent adherence to nonpolar substrates, where chlorinated polyolefins are used traditionally, there are no reports that found novel uses and features by combining modified polyolefin with polyamide.

The purpose of the invention lies in providing a novel chlorine-free modified polyolefin with excellent adherence to polyolefinic resin moldings, with no tack, and also with excellent cohesion. As a result of diligent investigations for solving this subject, the inventors have found that the excellent adherence to nonpolar substrates, the elimination of tack, the enhancement of cohesion and so on can be achieved at the same time by melting with kneading to react the modified polyolefin, which can be obtained by using an unsaturated carboxylic acid anhydride as an essential ingredient, with a particular polyamide, leading to the invention based on this knowledge.

SUMMARY OF THE INVENTION

As described, according to the invention, following (1) through (6) are provided.

(1) A polyamide-modified polyolefin composition obtainable by heating to react (A) modified polyolefin with weight average molecular weight of not less than 5,000 to not more than 150,000, graft modified so as the content of unsaturated carboxylic acid anhydride to become not less than 0.1 wt. % to not more than 20 wt. % based on raw material polyolefin, and (B) polyamide with number average molecular weight of not less than 3,000 to not more than 30,000 represented by formula [1], so as the weight ratio of (A) to (B) to become 400:1 to 1:2.

$$H-(NH-C_nH_{2n}-CO)_m-OH \qquad [1]$$

(wherein n denotes an integer not less than 6 to not more than 13, and m denotes polymerization degree).

(2) A polyamide-modified polyolefin composition obtainable by heating to react (A) modified polyolefin with weight average molecular weight of not less than 5,000 to not more than 150,000, graft modified so as the content of unsaturated carboxylic acid anhydride to become not less than 0.1 wt. % to not more than 20 wt. % based on raw material polyolefin and the content of ethylenic unsaturated monomer to become not less than 0.01 wt. % to not more than 900 wt. % base on raw material polyolefin, and (B) polyamide with number average molecular weight of not less than 3,000 to not more than 30,000 represented by said formula [1], so as the weight ratio of (A) to (B) to become 400:1 to 1:2.

(3) An adhesive for nonpolar substrates using the polyamide-modified polyolefin composition of (1) or (2).

(4) A primer for nonpolar substrates using the polyamide-modified polyolefin composition of (1) or (2).

(5) A paint binder using the polyamide-modified polyolefin composition of (1) or (2).

(6) An ink binder using the polyamide-modified polyolefin composition of (1) or (2).

DETAILED DESCRIPTION OF THE INVENTION

The polyolefins to become the raw materials of modified polyolefin to be used in the invention are homo- or co-polymers of α-olefin with number of carbon atoms of 2 to 20, preferably 2 to 6, such as ethylene, propylene, butene-1, pentane-1, hexene-1, heptene-1, octene-1 and 4-methyl-1-pentene, chain or cyclic polyenes such as cyclopentene, cyclohexene, 1,4-hexadiene, 1,5-hexadiene, divinylbenzene, 1,3-cyclopentadiene, 1,3-cyclohexadiene and 5-vinyl-2-norbornene, styrene, substituted styrene, etc.

Moreover, the nonpolar substrates referred to so in the invention point to nonpolar sheets, films or moldings of polypropylene, polyethylene, ethylene-propylene copolymer, ethylene-propylene-diene copolymer, ethylene-vinyl acetate copolymer, etc. Also, they include surface-treated ones of these substrates with plasma, corona or the like.

The proportion of said olefin monomer in the polyolefin that becomes the raw material of modified polyolefin can be selected arbitrarily, but, for the inventive polyamide-modified polyolefin to have the adherence to propylene substrate among nonpolar substrates, the proportion of propylene is preferable to be 50 to 98%. If under 50%, then the adherence to propylene substrate is poor, and, if over 98%, the flexibility is insufficient.

The usable molecular weight of polyolefin can be selected freely so as the weight average molecular weight of modified polyolefin to become 5,000 to 150,000, but, even a polyolefin with weight average molecular weight of over 150,000 becomes usable by the publicly known methods for adjusting the molecular weight to said suitable range by degrading in the presence of heat or radical, and the like.

As the unsaturated carboxylic acid anhydrides to be used in the invention, anhydrides of maleic acid, itaconic acid, citraconic acid, aconitic acid, etc. are mentioned. These anhydrides can be used solely or in combination, but the use of maleic anhydride is preferable. The use level of unsaturated carboxylic acid anhydride is preferable to make so as the content in modified polyolefin to become 0.1 to 20 wt. %, preferably 0.3 to 15 wt. % based on polyolefin. If the content is under this range, then decreased adherence to nonpolar substrates, aggravated solubility and decreased reactivity with polyamide result and inversely, if too much, decreased adherence and more generation of unreacted unsaturated carboxylic acid anhydride result, which is unpreferable.

In the invention, ethylenic unsaturated monomer can be used simultaneously with unsaturated carboxylic acid anhydride. Moreover, it is also possible to react modified polyolefin, in which the raw material polyolefin was modified beforehand with ethylenic unsaturated monomer, with unsaturated carboxylic acid anhydride. As the ethylenic unsaturated monomers referred to so here, vinyl esters such as vinyl acetate and vinyl propionate, (meth)acrylic acid and its derivatives such as alkyl ester, vinyl ethers such as butyl vinyl ether, cyclohexyl vinyl ether and hydroxybutyl vinyl ether, unsaturated dicarboxylic acids such as maleic acid and itaconic acid and their derivatives such as alkyl ester, dienes such as cyclopentadiene and dicyclopentadiene, styrene, divinylbenzene, and the like are mentioned. Said monomers can be used solely or in combination. They are appropriately used adapting for the purposes of improved solubility of modified polyolefin and compatibility with other resins, improved grafting rate, controlled hardness of film, etc., but, if the use level is not suppressed within 900 wt. % based on raw material polyolefin, the adherence to nonpolar substrates becomes poor.

The grafting reaction of unsaturated carboxylic acid anhydride or ethylenic unsaturated monomer onto polyolefin raw material can be conducted by publicly known methods, and, for example, the solution method wherein the raw material polyolefin is dissolved into solvent such as toluene and then radical initiator and unsaturated carboxylic acid anhydride or ethylenic unsaturated monomer are added, the melt method wherein, employing Banbury mixer, kneader, extruder, etc., radical initiator and unsaturated carboxylic acid anhydride or ethylenic unsaturated monomer are added to molten raw material polyolefin, and the like are mentioned.

The radical initiator can be selected appropriately from publicly known products, but, it is preferable to use organic peroxides, for example, benzoyl peroxide, dicumyl peroxide, lauroyl peroxide, di-tert-butyl peroxide and cumene hydroperoxide. The type and the use level of radical initiator can be selected appropriately depending on the reaction conditions, but it is preferable to use around 0.1 to 5 wt. %. If under this level, then the grafting reaction rate decreases, and, even if over that, decreased grafting reaction rate and side reactions like internal crosslinking can occur.

The weight average molecular weight of modified polyolefin obtained is 5,000 to 150,000, preferably 10,000 to 120,000. If under 5,000, then the adherence to nonpolar substrates becomes poor, and, if over 150,000, the workability and the solubility into solvent decrease due to increased viscosity.

The weight average molecular weight of polyolefin and modified polyolefin can be determined by means of light scattering method, GPC (gel permeation chromatography) method, etc.

The polyamides to be used in the invention are represented by following formula [1]

(wherein n denotes an integer not less than 5 to not more than 12, and m denotes polymerization degree), and are ring-opening polymers of lactam and polycondensed products obtainable through polycondensation of aminocarboxylic acid, and the like. Concretely, they are polymers of ε-caprolactam, aminocaproic acid, 7-aminoheptanoic acid, 11-aminoundecanoic acid, ω-laurolactam, etc., and polyamides commonly called polyamide 6, polyamide 11, polyamide 12 and polyamide 13 are used preferably.

The invention uses such polyamides having amino group and carboxyl group at the end of molecule, respectively, and aims at reacting amino group in polyamide with acid anhydride group in modified polyolefin during melting and kneading process.

Hence, block copolymers of two or more kinds of said polyamides and copolymers obtainable from two or more kinds of monomers, and the like also retain a structure having amino group and carboxyl group at the end of molecule, respectively, thus enabling them to be used naturally.

The number average molecular weight of polyamide usable in the invention is not less than 3,000 to not more than 30,000, preferably not less than 5,000 to not more than 20,000. If the molecular weight is under 3,000, then improved effects on cohesion and tackiness cannot be seen, and, if over 30,000, the workability on kneading decreases, the reactivity with acid anhydride group decreases, or the property of solution becomes poor, which is unpreferable.

The number average molecular weight of polyamide can be determined by means of vapor pressure or osmotic pressure method, GPC (gel permeation chromatography) method, etc. It is also possible to measure the relative viscosity and then to convert into the number average molecular weight.

It is required to use the inventive modified polyolefin and polyamide at weight ratio of 400:1 to 1:2. If the use level of polyamide is under 400:1, then improved effects on cohesion and tackiness cannot be achieved, and, if the use level of modified polyolefin is under 1:2, the solubility into solvent decreases or the adherence to nonpolar substrates is lost.

As the method of producing the inventive polyamide-modified polyolefin composition, a method wherein, employing Banbury mixer, kneader, extruder, etc., modified polyolefin and polyamide are molten and kneaded at a temperature higher than the melting points of both is preferable, but, they may be reacted in solution, when polyamide is soluble or swellable into suitable solvent. Particularly preferable is a method wherein both modified polyolefin and polyamide are molten and kneaded homogeneously at a temperature lower than the reaction temperature of them and then temperature is raised over the reaction temperature to conduct the reaction. The identification of reaction can be performed by FT-IR, NMR, etc., but, in the case of low modifying level or the like, the measurement is performed with differential scanning calorimeter, thus making it possible to know also from the disappearance of peak of melting point of polyamide before modification by analogy.

The inventive polyamide-modified polyolefin composition can be used as an adhesive or primer for nonpolar substrates, paint binder resin and ink binder resin. It can be used in the form adapted to uses such as solution, powder and sheet. Moreover, if needed, additives, for example, antioxodant, light stabilizer, ultraviolet absorber, pigment, dye, inorganic filler, etc. may be also formulated for use.

In the applications to adhesive and ink binder resin, not only nonpolar substrates such as polyethylene and polypropylene, but also polar substrates such as polyester, polyurethane and polyamide are often used in combination. Since the inventive resin also has the adherence to such polar substrates, it is used suitably in said applications.

Similarly, when using as a primer and paint binder resin, it is also excellent in the adherence to upper paint and clear coating, thus enabling to use it preferably.

When using as a paint and ink binder, other resins such as urethane resin, epoxy resin, acrylic resin, phenol resin, alkyd resin, silicone resin and nitrocellulose may be blended additionally, if needed. Upon blending with other resins, it is required to use the inventive polyamide-modified polyolefin composition in amounts of at least 8% or more by solids based on overall resin weight to maintain the adherence to nonpolar substrates.

The feature of the invention is to prepare the polyamide-modified polyolefin composition by utilizing the reaction between anhydride group in modified polyolefin and amino group existing at one end of polyamide molecule. Conventional polyolefins modified with unsaturated acid anhydride had the drawbacks of tack and insufficient cohesion, but the adherence to nonpolar substrates was excellent. It is presumed that, through the introduction of polyamide component into the skeleton of modified polyolefin, it has become possible to provide the physical entangling effect due to increased molecular weight and the hydrogen-bonding strength of polyamide chain, thus leading to improved cohesion.

Moreover, since polyamide is a harder component compared with modified polyolefin, the introduction thereof is tied to the improvement in tackiness. Improved tackiness and cohesion have become possible without spoiling the adherence to nonpolar substrates by restricting the use level of polyamide to a suitable amount, in addition to the fact that polyamide has the adherence to nonpolar substrates originally to some extent. When increasing the use level of polyamide, the solubility into organic solvents such as toluene, ethyl acetate and methyl ethyl ketone and the compatibility with other resins tend commonly to decrease, but this can be improved by simultaneously using ethylenic unsaturated monomer such as acrylic monomer.

In following, the invention will be illustrated in more detail based on examples, but the invention is not confined thereto.

EXAMPLE

Trial Example-1

Into a twin extruder with L/D=34 and $\phi$=40 mm, 100 parts by weight of propylene-ethylene-α-olefin copolymer (propylene component 68 mol %, ethylene component 8% and butene component 24 mol %, weight average molecular weight 65,000), 6 parts by weight of maleic anhydride and 2 parts by weight of di-t-butyl peroxide were put. The reaction was conducted under retention time of 12 minutes and barrel temperature of 180° C. (first barrel) to 220° C. (seventh barrel) and then deaeration was performed at seventh barrel to remove residual maleic anhydride. The weight average molecular weight of modified polyolefin obtained was 38,000 and the grafting rate of maleic anhydride was 3.5 wt. %. Besides, the weight average molecular weight was determined by GPC and the grafting rate by titration.

Trial Example-2

In a four-neck flask attached with stirrer, cooling pipe and dropping funnel, 100 g of propylene-ethylene copolymer (propylene component 97.5% and ethylene component 2.5%, weight average molecular weight 55,000) were dissolved into 400 g of toluene under heating. Then, while keeping the temperature of system at 110° C. with stirring, 1 g of dicumyl peroxide was added dropwise and, thereafter, the degradation treatment was performed for 1 hour. Next, 10 g of itaconic anhydride, 1 g of hydroxyethyl acrylate, 80 g of methyl methacrylate and 5 g of dicumyl peroxide were added dropwise over 3 hours, respectively, and the mixture was reacted further for 1 hour. After the reaction, the reaction mixture was cooled to room temperature and then purified by putting into a large quantity of acetone to obtain modified polyolefin with weight average molecular weight of 46,000, grafting rate of itaconic anhydride of 4.2 wt. % and grafted weight of hydroxyethyl acrylate and methyl methacrylate of 24.9%.

Trial Example-3

Into a twin extruder with L/D=34 and $\phi$=40 mm, 100 parts by weight of polypropylene (weight average molecular weight 360,000) and 2 parts by weight of di-t-butyl peroxide were put. The degradation was conducted under retention time of 8 minutes, barrel temperature of 180° C. (first barrel) to 220° C. (seventh barrel) to obtain degraded polypropylene with weight average molecular weight of 57,000. Hundred parts by weight of degraded polypropylene obtained, 10 parts by weight of methyl acrylate, 5 parts by weight of cyclohexyl acrylate and 3 parts by weight of di-t-butyl peroxide were put into the same twin extruder, and the acrylic modification was performed under retention time of 10 minutes, barrel temperature of 180° C. (first barrel) to 220° C. (seventh barrel). Hundred parts by weight of sample obtained by purifying this acrylic modification product in acetone, 10 parts by weight of maleic anhydride and 2 parts by weight of di-t-butyl peroxide were put into the same twin extruder, and the reaction was performed under retention time of 12 minutes and barrel temperature of 180° C. (first barrel) to 220° C. (seventh barrel). Deaeration was performed at seventh barrel to remove residual maleic anhydride. The weight average molecular weight of modified polyolefin obtained was 45,000, the grafting rate of maleic anhydride was 3.3 wt. %, and the grafted weight of methyl acrylate and cyclohexyl acrylate was 3.2%.

Trial Example-4

Into a twin extruder with L/D=60 and $\phi$=15 mm, 100 parts by weight of propylene-ethylene-α-olefin copolymer (propylene component 80 mol %, ethylene component 10% and butene component 10 mol %, weight average molecular weight 100,000), 6 parts by weight of maleic anhydride, 6 parts by weight of styrene and 2 parts by weight of di-t-butyl peroxide were put. The reaction was conducted under retention time of 5 minutes and barrel temperature of 80° C. (first barrel) through 180° C. (third barrel) to 60° C. (eighth barrel) and the deaeration was performed at seventh barrel to remove residual maleic anhydride and styrene. The weight average molecular weight of modified polyolefin obtained was 68,000 and the grafting rate of maleic anhydride was 5.1 wt. %.

Example-1

Into a Labo Plastomill (from Toyo Seiki), 33 g of modified polyolefin obtained in Trial example-1 were put. After molten at 120° C., 6.6 g of polyamide 12 (number average molecular weight 15,000) were added and the mixture was kneaded for 15 minutes. Thereafter, temperature was raised to 200° C. and the reaction was continued further for 15 minutes. The reaction mixture was taken out and cooled to room temperature to obtain polyamide-modified polyolefin.

Example-2

Into a Labo Plastomill, 38 g of modified polyolefin obtained in Trial example-2 were put. After molten at 120° C., 1.9 g of polyamide 6 (number average molecular weight 20,000) were added and the mixture was kneaded for 15 minutes. Thereafter, temperature was raised to 220° C. and the reaction was continued further for 15 minutes. The reaction mixture was taken out and cooled to room temperature to obtain polyamide-modified polyolefin.

Example-3

Into a Labo Plastomill, 35 g of modified polyolefin obtained in Trial example-3 were put. After molten at 120° C., 5 g of polyamide 6/11 (40/60) (number average molecular weight 7,000) were added and the mixture was kneaded for 15 minutes. Thereafter, temperature was raised to 180° C. and the reaction was continued further for 15 minutes. The reaction mixture was taken out and cooled to room temperature to obtain polyamide-modified polyolefin.

Example-4

Into a twin extruder with L/D=60 and φ=15 mm, 100 parts by weight of modified polyolefin obtained in Trial example-4 and 8 parts by weight of polyamide 12 were put. The reaction was conducted under retention time of 5 minutes and barrel temperature of 80° C. (first barrel) through 120° C. (third barrel) through 260° C. (fifth barrel) to 100° C. (eights barrel) and then deaeration was performed at seventh barrel to remove water, thus obtaining polyamide-modified polyolefin.

Comparative Example-1

Taking the procedure similar to Example-1 and using aminocaproic acid in place of polyamide 12, polyamide-modified polyolefin was obtained.

Comparative Example-2

Taking the procedure similar to Example-1 and using polyamide 6, 10 (number average molecular weight 23,000, amine number 0.2) in place of polyamide 12, polyamide-modified polyolefin was obtained.

Comparative Example-3

In Example-1, the use level of modified polyolefin was made to be 3 g and the use level of polyamide 12 was made to be 40 g, thus obtaining polyamide-modified polyolefin.

Of the polyamide-modified polyolefins and modified polyolefin obtained in Examples 1 through 4, Trial example 1 and Comparative Examples 1 through 3 as described above, 10 wt. % toluene solutions were prepared, respectively, and following tests were performed. The results are shown in Table 1.

Adherence Test

Each said toluene solution was spray coated onto an ultrahigh rigidity polypropylene plate so as the dried film thickness to become 10 to 15 μm, which was dried for 30 minutes at 80° C. After allowed the specimen to stand for 3 days at room temperature, slits reaching the base were engraved on the surface of coated film with cutter to make 100 crosscuts at intervals of 1 mm. Cellophane adhesive tape was adhered closely thereon and peeled off in the direction of 180° five times to count the number of remaining crosscuts.

Heat Seal Strength Test

Each said toluene solution was coated onto a polypropylene film after corona surface treatment (surface tension 38 dyne/cm) using #20 Meyer bar, which was dried for 15 hours at room temperature. The specimen was folded so that the film surfaces were superposed and heat seal test was performed under the conditions of 1.5 kg/cm$^2$, 90° C. and 10 seconds using No. 276 Heat Seal Tester (from Yasuda Seiki). Each specimen was cut so as the width to become 1 cm and peeled off under the conditions of 5 kg in weight and 100 mm/min using Tensilon to measure the peeling strength. Test was made thrice to obtain the average value thereof as a result.

Tackiness Test

Each said toluene solution was coated onto a polypropylene film after corona surface treatment (surface tension 38 dyne/cm) using #20 Meyer bar, which was dried for 15 hours at room temperature. The specimen was folded so that the film surfaces were superposed and, after pressed down lightly with fingers, it was peeled off. The liability of peeling was observed to obtain an index of tackiness.

TABLE 1

Test results

| Sample | Adherence test | Heat seal strength | Tackiness |
| --- | --- | --- | --- |
| Example-1 | 100/100 | 510 g/cm | None |
| -2 | 100/100 | 480 g/cm | None |
| -3 | 100/100 | 470 g/cm | None |
| -4 | 100/100 | 630 g/cm | None |
| Trial example-1 | 100/100 | 300 g/cm | Strong tack |
| Comparative example-1 | 100/100 | 350 g/cm | Strong tack |
| -2 | 80/100 | 320 g/cm | Weak tack |
| -3 | 0/100 | 110 g/cm | None |

Paint Test

Of the polyamaide-modified polyolefins and modified polyolefin obtained in Examples 1 through 4, Trial example 1 and Comparative Examples 1 through 3, 40 wt. % toluene solutions were prepared, respectively, and paints of following formulations were prepared making them as binder resins.

| | |
| --- | --- |
| Binder resin (40% toluene solution) | 100 pts. by weight |
| Alkyd resin (Phthalkyd V904, from Hitachi Chemical) | 10 pts. by weight |
| Titanium dioxide | 4.5 pts. by weight |
| Carbon black | 0.5 pts. by weight |
| Rouge | 2 pts. by weight |
| Talc | 15 pts. by weight |
| Silica delustering agent | 3 pts. by weight |

After kneaded for about 1 hour in a sand mill, said composition was diluted with toluene so as the viscosity to become 12 to 13 sec/20° C. through Ford cup #4 for adjustment. Each paint was spray coated onto an ultrahigh rigidity polypropylene plate so as the dried film thickness to become 30 to 35 μm, which was dried for 30 minutes at room temperature and then baked for 30 minutes at 80° C. After allowed the specimen to stand for 48 hours at room temperature, following tests were performed. The results are shown in Table 2.

Adherence Test

The crosscut test similar to above was performed.

Warm water resistance test

The specimen was soaked into warm water for 240 hours at 40° C. to visually observe the state of painted film. In addition, the adherence test by crosscut method was performed.

Gasoline Resistance Test

A scratch (X mark) reaching the base were engraved on the surface of each painted film with cutter knife and soaked into gasoline to visually observe the state of painted film.

TABLE 2

| | | Test results | |
|---|---|---|---|
| Sample | Adherence test | Warm water resistance test | Gasoline resistance test |
| Example-1 | 100/100 | No abnormality 100/100 | After 2 hr soaking, no abnormality |
| Example-2 | 100/100 | No abnormality 90/100 | After 2 hr soaking, no abnormality |
| Example-3 | 100/100 | No abnormality 95/100 | After 2 hr soaking, no abnormality |
| Example -4 | 100/100 | No abnormality 100/100 | After 2 hr soaking, no abnormality |
| Trial example-1 | 100/100 | No abnormality 100/100 | After 2 hr soaking, no abnormality |
| Comparative example-1 | 100/100 | Blister generation 0/100 | After 2 hr soaking, no abnormality |
| Comparative example-2 | 50/100 | No abnormality 0/100 | After 1 hr soaking, film peeling |
| Comparative example-3 | 0/100 | Film peeling 0/100 | After 30 min soaking, film peeling |

Primer Test

Of the polyamide-modified polyolefins and modified polyolefin obtained in Examples 1 through 4, Trial example 1 and Comparative Examples 1 through 3, 10 wt. % toluene solutions were prepared, respectively, and each was spry coated onto an ultrahigh rigidity polypropylene plate so as the dried film thickness to become 10 to 15 μm, which was dried for 30 minutes at 80° C. Next, two-component urethane-based upper white paint was spray coated so as the dried film thickness to become 45 to 50 μm. After allowed to stand for 15 minutes at room temperature, this was baked for 30 minutes at 90° C. The specimen was allowed to stand for 3 days at room temperature and then a test similar to said paint test was performed. Results are shown in Table 3.

TABLE 3

| | | Test results | |
|---|---|---|---|
| Sample | Adherence test | Warm water resistance test | Gasoline resistance test |
| Example-1 | 100/100 | No abnormality 100/100 | After 2 hr soaking, no abnormality |
| Example-2 | 100/100 | No abnormality 95/100 | After 2 hr soaking, no abnormality |
| Example-3 | 100/100 | No abnormality 100/100 | After 2 hr soaking, no abnormality |
| Example -4 | 100/100 | No abnormality 100/100 | After 2 hr soaking, no abnormality |
| Trial example-1 | 100/100 | No abnormality 100/100 | After 2 hr soaking, no abnormality |
| Comparative example-1 | 100/100 | Blister generation 0/100 | After 2 hr soaking, no abnormality |
| Comparative example-2 | 80/100 | No abnormality 30/100 | After 1 hr soaking, film peeling |
| Comparative example-3 | 0/100 | Film peeling 0/100 | After 30 min soaking, film peeling |

Ink Test

Of the polyamide-modified polyolefins and modified polyolefin obtained in Examples 1 through 4, Trial example 1 and Comparative examples 1 through 3, 40 wt. % toluene/ethyl acetate (80/20, weight ratio) solutions were prepared, respectively, and inks of following formulations were prepared making them as binder resins.

| | |
|---|---|
| Binder resin (40% solution) | 100 pts. by weight |
| Urethane resin for ink | 50 pts. by weight |
| Titanium dioxide | 180 pts. by weight |
| Ethyl acetate | 100 pts. by weight |
| Isopropyl alcohol | 50 pts. by weight |

Said composition was milled in a paint shaker to prepare white printing ink. Each printing ink obtained was coated onto a polyester film (PET), nylon film (NY) or oriented polypropylene film (OPP) with #12 Meyer bar. Cellophane tape was stuck on the coated surface and the state of coated surface was observed visually when peeled off this rapidly. Results are shown in Table 4.

TABLE 4

| | Test results | | | |
|---|---|---|---|---|
| | | | Adhesiveness | |
| | Compatibility | OPP | PET | NY |
| Example-1 | ○ | ○ | ○ | ○ |
| -2 | ○ | ○ | ○ | ○ |
| -3 | ○ | ○ | ○ | ○ |
| -4 | ○ | ○ | ○ | ○ |
| Trial example-1 | Δ | Δ | X | X |
| Comparative example-1 | ○ | Δ | X | Δ |
| -2 | Δ | X | Δ | ○ |
| -3 | X | X | X | Δ |

※ In the table, ○: Good, Δ: Slightly poor, X: Poor

When observing the specimen after measurement of heat seal strength, peeling was caused not from substrate, but in resin layer. It can be said therefore that the heat seal strength is a value significantly reflecting the cohesion and tackiness. In the case of Trial example-1 wherein modification was made only with maleic anhydride, the adherence to nonpolar substrate is excellent, but dried film exhibits strong tack. In Comparative example-1, stronger tack is observed. In Comparative example-2, some improvement effects can be seen in the tackiness and cohesion, but the adherence to nonpolar substrate decreases. In Comparative example-3, the tackiness is good, but the decrease in adherence is remarkable. Moreover, also in paint test, primer test and ink test, the polyamide-modified polyolefins in examples show excellent physical properties. Hence, it can be said that the inventive polyamide-modified polyolefins are very useful.

What is claimed is:

1. A polyamide-modified polyolefin composition obtained by reacting:

Component (A) a polyolefin graft modified with an unsaturated carboxylic acid anhydride and an ethylenically unsaturated monomer other than an ethylenically unsaturated carboxylic acid or derivative thereof, with Component (B) a polyamide represented by formula (1):

$$H-(NH-C_nH_{2n}-CO)_m-OH \quad (1)$$

where n is an integer of from 5 to 12 and m denotes the degree of polymerization;

wherein said Component (A) has a weight average molecular weight of from 5,000 to 150,000;

wherein the content of the unsaturated carboxylic acid anhydride of said Component (A) is from 0.1 wt % to 20 wt %, based on the polyolefin;

wherein the content of the ethylenically unsaturated monomer of said Component (A) is from 0.01 wt % to 900 wt %, based on the polyolefin;

wherein said Component (B) has a number average molecular weight of from 3,000 to 30,000; and wherein the weight ratio of Component (A) to Component (B) is 400:1 to 1:2.

2. The polyamide-modified polyolefin composition according to claim 1, wherein said unsaturated carboxylic acid anhydride is at least one anhydride selected from the group consisting of maleic acid anhydride, itaconic acid anhydride, citraconic acid anhydride and aconitic acid anhydride.

3. The polyamide-modified polyolefin composition according to claim 2, wherein said ethylenically unsaturated monomer is at least one selected from the group consisting of a vinyl ester, a vinyl ether, a diene, styrene, and divinyl benzene.

4. The polyamide-modified polyolefin composition according to claim 2, wherein said ethylenically unsaturated monomer is at least one selected from the group consisting of (meth)acrylic acid and a (meth)acrylic acid alkyl ester.

5. An adhesive for nonpolar substrates using the polyamide-modified polyolefin composition of claim 2.

6. A primer for nonpolar substrates using the polyamide-modified polyolefin composition of claim 2.

7. A paint binder using the polyamide-modified polyolefin composition of claim 2.

8. An ink binder using the polyamide-modified polyolefin composition of claim 2.

9. The polyamide-modified polyolefin composition according to claim 1, wherien said ethylenically unsaturated monomer is at least one selected from the group consisting of a vinyl ester, a vinyl ether, (meth)acrylic acid, a (meth)acrylic acid alkyl ester, a diene, styrene, and divinyl benzene.

10. The polyamide-modified polyolefin composition according to claim 1, wherein said ethylenically unsaturated monomer is at least one selected from the group consisting of (meth)acrylic acid and a (meth)acrylic acid alkyl ester.

11. An adhesive for nonpolar substrates using the polyamide-modified polyolefin composition of claim 1.

12. A primer for nonpolar substrates using the polyamide-modified polyolefin composition of claim 2.

13. A paint binder using the polyamide-modified polyolefin composition of claim 1.

14. An ink binder using the polyamide-modified polyolefin composition of claim 1.

* * * * *

UNITED STATES PATENT AND TRADEMARK OFFICE
CERTIFICATE OF CORRECTION

PATENT NO.    : 6,462,130 B2
DATED         : October 8, 2002
INVENTOR(S)   : Fujino et al.

It is certified that error appears in the above-identified patent and that said Letters Patent is hereby corrected as shown below:

<u>Title page,</u>
The CPA information has been omitted. Item [45] and the Notice information should read as follows:
-- [45]   **Date of Patent:   *Oct. 8, 2002**
(*) Notice: This patent issued on a continued prosecution
           application filed under 37 CFR 1.53(d), and is
           subject ot the twenty year patent term provisions
           of 35 U.S.C 154(a)(2).

Subject to any disclaimer, the term of this
   patent is extended or adjusted under 35
   U.S.C. 154(b) by 0 days. --

Signed and Sealed this

First Day of April, 2003

JAMES E. ROGAN
*Director of the United States Patent and Trademark Office*